United States Patent
Abali et al.

(10) Patent No.: US 8,775,776 B2
(45) Date of Patent: Jul. 8, 2014

(54) HASH TABLE USING HASH TABLE BANKS

(75) Inventors: Bulent Abali, Tenafly, NJ (US); John J. Reilly, Huntington, VT (US)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 13/352,410

(22) Filed: Jan. 18, 2012

(65) Prior Publication Data

US 2013/0185537 A1    Jul. 18, 2013

(51) Int. Cl.
*G06F 12/00*     (2006.01)

(52) U.S. Cl.
USPC .... 711/216; 711/202; 711/205; 711/E12.001; 711/E12.006; 711/E12.059

(58) Field of Classification Search
USPC ............ 711/202, 205, 216, E12.001, E12.06, 711/E12.059
See application file for complete search history.

(56) References Cited

U.S. PATENT DOCUMENTS

| | | | |
|---|---|---|---|
| 5,032,987 A | 7/1991 | Broder et al. | |
| 5,281,967 A | 1/1994 | Jung | |
| 5,339,398 A | 8/1994 | Shah et al. | |
| 5,532,694 A | 7/1996 | Mayers et al. | |
| 6,236,341 B1 | 5/2001 | Dorward et al. | |
| 6,449,613 B1 | 9/2002 | Egolf et al. | |
| 6,785,278 B1 | 8/2004 | Calvignac et al. | |
| 7,650,429 B2 | 1/2010 | Panigrahy et al. | |
| 7,664,927 B2 | 2/2010 | Erlingsson et al. | |
| 8,250,081 B2 * | 8/2012 | Nash ............................ | 707/754 |
| 2003/0204698 A1 | 10/2003 | Sachedina et al. | |
| 2005/0147113 A1 | 7/2005 | Brown | |
| 2008/0028139 A1 * | 1/2008 | Cypher ........................ | 711/108 |
| 2011/0225391 A1 | 9/2011 | Burroughs et al. | |

FOREIGN PATENT DOCUMENTS

| | | |
|---|---|---|
| JP | 2000201081 | 7/2000 |
| WO | 9519662 | 7/1995 |

* cited by examiner

*Primary Examiner* — Midys Rojas
(74) *Attorney, Agent, or Firm* — Gibb & Riley, LLC; Michael J. LeStrange, Esq.

(57) ABSTRACT

A hash table method and structure comprises a processor that receives a plurality of access requests for access to a storage device. The processor performs a plurality of hash processes on the access requests to generate a first number of addresses for each access request. Such addresses are within a full address range. Hash table banks are operatively connected to the processor. The hash table banks form the storage device. Each of the hash table banks has a plurality of input ports. Specifically, each of the hash table banks has less input ports than the first number of addresses for each access request. The processor provides the addresses to the hash table banks, and each of the hash table banks stores pointers corresponding to a different limited range of addresses within the full address range (each of the different limited range of addresses is less than the full address range).

24 Claims, 8 Drawing Sheets

HASH TABLE USING HASH TABLE BANKS

BACKGROUND

The present disclosure relates to hash table systems and methods, and more specifically to hash table systems and methods that use multiple hash table banks.

Hash tables are often used in place of conventional indexes to store and retrieve electronically stored information because the hash tables are much faster and are less resource intensive. Hash tables are generally more efficient than search trees or any other table lookup structure. For this reason, they are widely used in many kinds of computer software, particularly for associative arrays, database indexing, caches, and sets. Most hash table designs assume that hash collisions—different keys that map to the same hash value—will occur and must be accommodated in some way.

A hash table is made up of two parts: an array (the actual table where the data to be searched is stored) and a mapping function, known as a hash function. The hash function is a mapping from the input space to the integer space that defines the indices of the array. In other words, the hash function provides a way for assigning numbers to the input data such that the data can then be stored at the array index corresponding to the assigned number. There is always the chance that two inputs will hash to the same output. This indicates that both elements should be inserted at the same place in the array, and this is impossible. This phenomenon is known as a collision.

SUMMARY

A hash table structure comprises a processor that receives a plurality of access requests for access to a storage device. The processor performs a plurality of hash processes on the access requests to generate a first number of addresses for each access request. Such addresses are within a full address range. A plurality of hash table banks are also operatively connected to the processor. The hash table banks form the storage device, each of the hash table banks has a plurality of input ports. Specifically, each of the hash table banks has less input ports than the first number of addresses for each access request. The processor provides the addresses to the hash table banks, and each of the hash table banks stores pointers corresponding to a different limited range of addresses within the full address range (each of the different limited range of addresses is less than the full address range). A correlator is operatively connected to the hash table banks. The correlator receives pointers from the hash table banks, and the correlator correlates the pointers to the addresses for each of the access requests.

Another hash table structure herein comprises a processor that receives a plurality of access requests for access to a physical storage device. Again, the processor performs a plurality of hash processes on the access requests to generate a first number of addresses for each access request, and the addresses are within a full address range. Further, a plurality of hash table banks are operatively connected to the processor. The hash table banks form the physical storage device, each of the hash table banks has a plurality of physical input ports, and each of the hash table banks has less physical input ports than the first number of addresses for each access request. Also, the processor provides the addresses to the hash table banks, each of the hash table banks stores pointers corresponding to a different limited range of addresses within the full address range, and each of the different limited range of addresses is less than the full address range. This embodiment includes a plurality of physical multiplexors. One of the physical multiplexors is connected between each of the physical input ports and the processor. The physical multiplexors select an address to supply to a corresponding physical input port of the hash table banks. Additionally, a correlator is operatively connected to the hash table banks. Again, the correlator receives pointers from the hash table banks, and the correlator correlates the pointers to the addresses for each of the access requests.

A method of accessing a hash table structure herein receives a plurality of access requests for access to a physical storage device. The method performs a plurality of hash processes on the access requests, using the processor, to generate a first number of addresses for each access request. The addresses are again within a full address range. The method provides the addresses to the plurality of hash table banks that are operatively connected to the processor. As above, the hash table banks form the physical storage device, each of the hash table banks has a plurality of physical input ports, each of the hash table banks has less physical input ports than the first number of addresses for each access request, each of the hash table banks stores pointers corresponding to a different limited range of addresses within the full address range, and each of the different limited range of addresses is less than the full address range. The method selects an address to supply to a corresponding physical input port of the hash table banks using a plurality of physical multiplexors. One of the physical multiplexors is connected between each of the physical input ports and the processor. The method receives pointers from the hash table banks into a correlator operatively connected to the hash table banks, which correlates the pointers to the addresses for each of the access requests using the correlator. The method outputs different ones of the pointers from the correlator in response to each of the access requests.

A non-volatile storage medium embodiment herein is readable by computerized device. The non-volatile storage medium stores instructions, and the instructions are executable by the computerized device to perform a method of accessing a hash table structure, the method receives a plurality of access requests for access to a physical storage device. The method performs a plurality of hash processes on the access requests to generate a first number of addresses for each access request, the addresses are within a full address range. The method provides the addresses to a plurality of hash table banks. The hash table banks form the physical storage device. Each of the hash table banks has a plurality of physical input ports, each of the hash table banks has less physical input ports than the first number, each of the hash table banks stores pointers corresponding to a different limited range of addresses within the full address range, and each of the different limited range of addresses are less than the full address range. The method selects an address to supply to a corresponding physical input port of the hash table banks. The method correlates the pointers to the addresses for each of the access requests, and the method outputting different ones of the pointers in response to each of the access requests.

BRIEF DESCRIPTION OF THE DRAWINGS

The embodiments herein will be better understood from the following detailed description with reference to the drawings, which are not necessarily drawing to scale and in which.

DETAILED DESCRIPTION

When an item of information needs to be accessed from hash table, an access request is usually supplied. For example, various access words or half-words can be supplied. In such a situation, multiple data items are simultaneously supplied to the input ports of the hash table. As would be apparent to those ordinarily skilled in the art, hash table with a smaller number of inputs will be less expensive, consume smaller area footprint, consume less power, the less complicated, etc. than a corresponding hash table with a larger number of inputs. Therefore, because of cost and/or technology constraints, a designer may prefer to use hash tables with a limited number of inputs.

However, many access requests may simultaneously supply a greater number of requests to the hash table than the number of input ports that are available. For example, a circuit designer may have utilized a hash table with two input ports; however, there may be a need to handle and access request that simultaneously applies four half-words to the hash table. In view of this, the embodiments herein allow the circuit designer to utilize hash tables with less inputs than the expected number of simultaneous access request data items. In order to accomplish this, the systems and methods herein utilize multiple hash table banks, where the different hash table banks combined to perform the function of a single hash table bank.

In a most simplified example, for a designer that was limited to two input hash tables, yet needed to accommodate four simultaneous access request data items, the systems and methods herein provide two hash table banks, each of which has two inputs/outputs. This allows the four simultaneous access request data items to be processed simultaneously by the systems and methods herein, yet still allows the circuit designer to utilize the less expensive than smaller two input/output hash table bank structure. FIGS. 1-6, that are explained below, illustrate these concepts using simplified examples. Those ordinarily skilled in the art would understand that the systems and methods herein are applicable to much more sophisticated systems and structures, and that these simplified examples are not intended to limit claims at the end of this application, but are only intended to convey understanding of the systems and methods herein.

Figure 1:
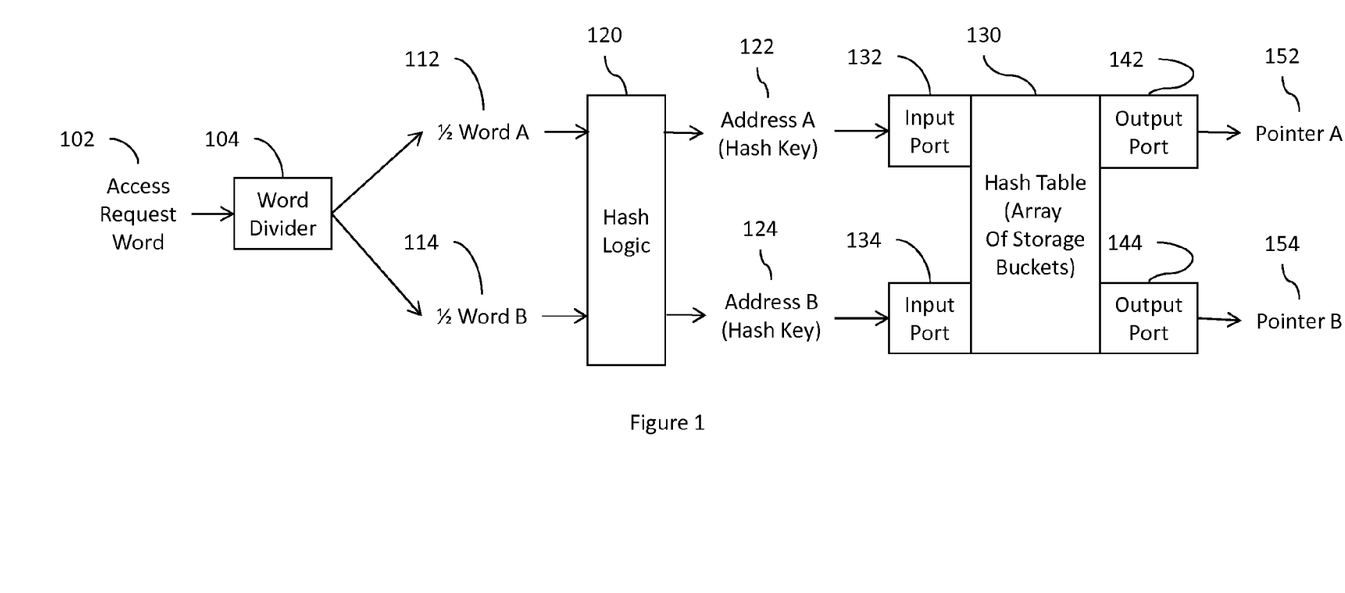
FIG. 1 is a schematic diagram of a hash table system illustrating embodiments herein.

FIG. 1 illustrates one exemplary embodiment herein where an access request (herein referred to as an access request word 102) is processed through a word divider 104. The word divider 104 splits the access request word 102 into half-words (½ word A 112 and ½ word B 114). For example, a 32-bit access request word could be split into two 16-bit half-words.

Next, hash logic 120 generates hash keys based on some portion of each of the half-words. For example, the hash processes can comprise exclusive-OR (XOR) operations performed on a portion (e.g., the first 4 bits) of the half-words. In the example shown in FIG. 1, the hash logic 120 creates address A 122 and address B 124, which are supplied to the input ports 132, 134 of the hash table 130. As is understood by those ordinarily skilled in the art, the hash table 130 comprises a storage array of units that are sometimes referred to as storage buckets, each of which can store a pointer. The pointers can be stored in the hash table banks in a first in first out (FIFO) order. The output ports 142, 144 output the appropriate pointers (pointer A 152, pointer B 154) corresponding respectively to address A and address B from the hash table, as shown in FIG. 1.

Figure 2:
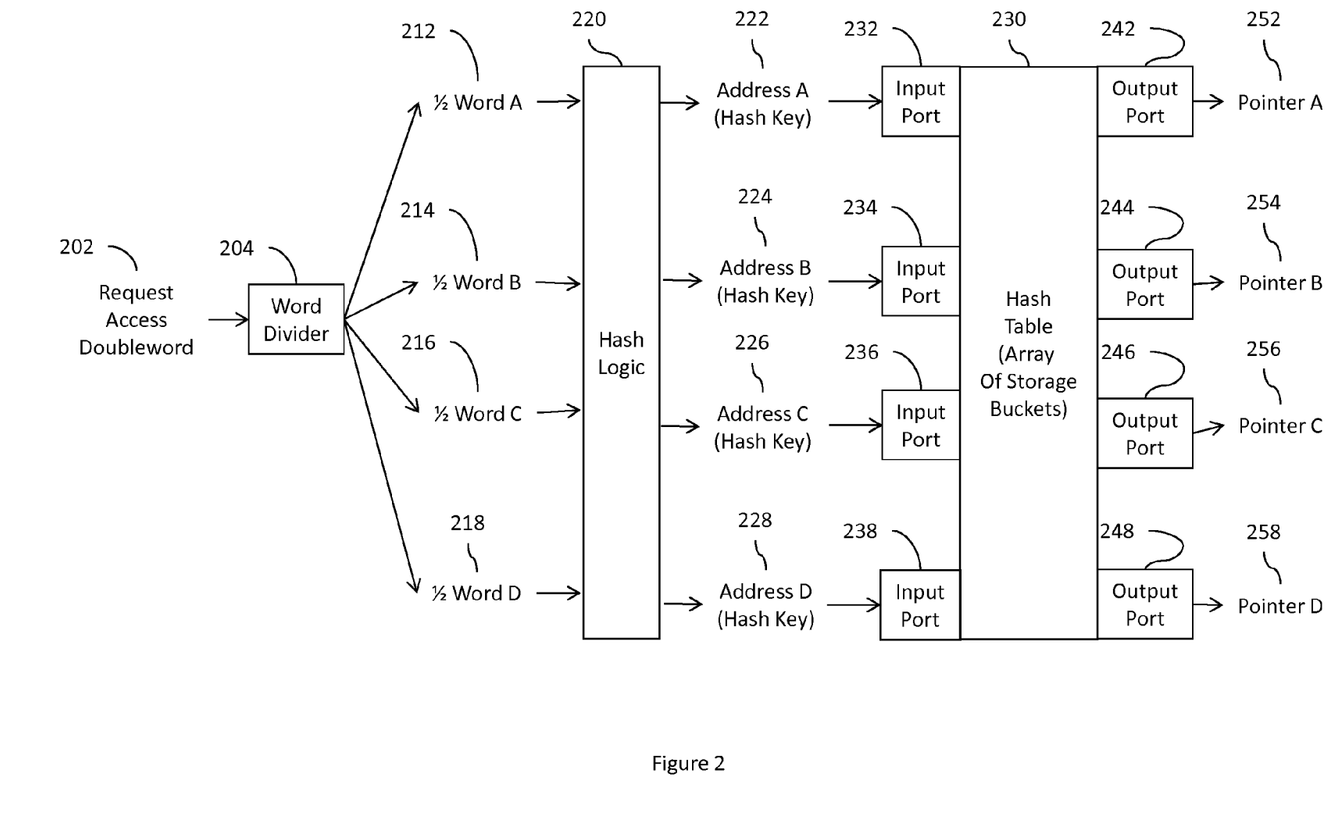
FIG. 2 is a schematic diagram of a hash table system illustrating embodiments herein.

FIG. 2 is somewhat similar to the system shown in FIG. 1; however, in FIG. 2, the access request is an access request double-word 202 (for example a 64 bit double-word, instead of a 32 bit word as in FIG. 1). This double-word 202 is similarly processed through a word divider 204. The word divider 204 splits the access request double-word 202 into four half-words (½ word A 212, ½ word B 214, ½ word C 216, and ½ word D 218). For example, a 64-bit access request word could be split into four 16-bit half-words.

Next, hash logic 220 generates hash keys based on some portion of each of the half-words. In the example shown in FIG. 2, the hash logic 220 creates address A-D (222-228) which are supplied to the four input ports 232-238 of the hash table 230. The four output ports 242-248 output the appropriate pointers (pointer A-pointer D (252-258)) corresponding respectively to addresses A-D from the hash table, as shown in FIG. 2.

However, a four input/output hash table 230 can be larger, more expensive, can consume more resources, etc., when compared to a comparable two input/output hash table 130. Therefore, in some circuit designs, it is only economically or physically feasible to use two input/output hash tables. Yet it is still desirable to be able to process more words (such as the double-words shown in FIG. 2) simultaneously through the hash table.

Figure 3:
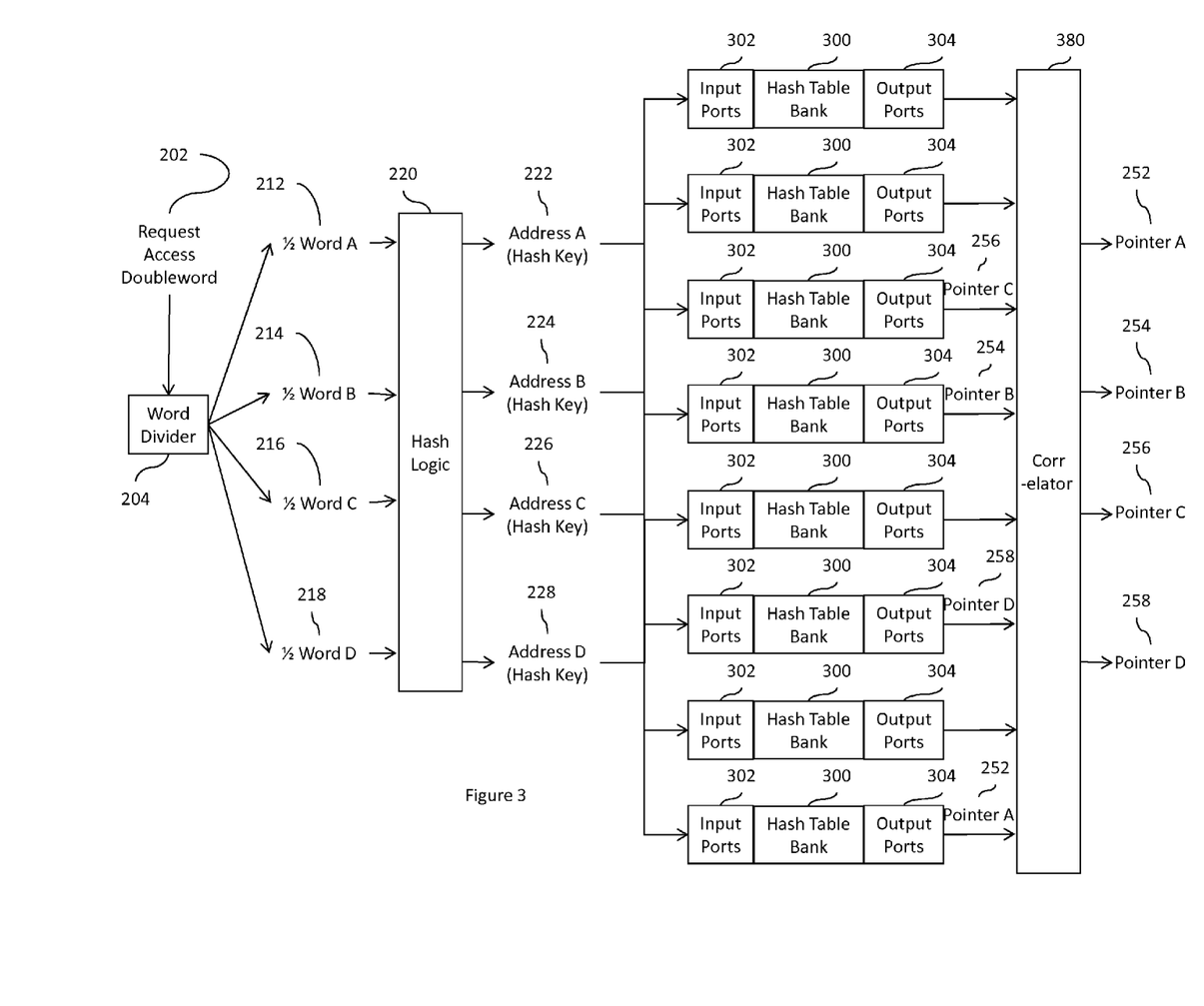
FIG. 3 is a schematic diagram of a hash table system illustrating embodiments herein.

Therefore, the system/structure shown in FIG. 3 uses the less expensive and smaller two input/output hash table structures as "hash table banks" to handle access request that produce four (or more) simultaneous inputs. The system shown in FIG. 3 similarly includes a word divider 204 that again receives a plurality of access requests (e.g., double-words 202) for access to the physical storage device (the hash table banks). The word divider 204 again splits the access request double-word 202 into four half-words (½ word A 212, ½ word B 214, ½ word C 216, and ½ word D 218).

Again, the hash logic 220 performs a plurality of hash processes on the access requests to generate addresses for each access request. Thus, the hash logic 220 generates hash keys based on some portion of each of the half-words. In the example shown in FIG. 3, the hash logic 220 creates address A-D (222-228), which are supplied to multiple physical storage devices that are referred to herein as hash table banks 300.

As shown in FIG. 3, the plurality of physical hash table banks 300 are operatively connected to the hash logic 220. Each of the hash table banks 300 includes multiple input ports 302 and a corresponding number of output ports 304, and each hash table bank 300 also comprises a storage array of units (storage buckets) each of which can store an item of data, such as a pointer. The hash table banks 300 combine to function as a single hash table (a single physical storage device made up of banks) in place of the single hash tables 130 and 230 discussed above.

The hash logic 220 generates an arbitrarily named "first" number of addresses for each access request (four addresses 222-228 in this example). The addresses are within what is termed herein a "full" address range (e.g., between, for example, address 0 and 10,000 (or any other appropriate range)) representing all possible addresses produced by the logical algorithm of the hash logic 220. Each of the hash table banks 300 stores pointers corresponding to a different limited range of addresses within the full address range. In other words, each of the different limited range of addresses stored by each individual hash table bank is less than the full address range of possible addresses produced by the hash logic 220, and each hash table bank 300 only stores a discrete, unique portion of the full address range that is not stored by any of the other hash table banks.

Figure 5:
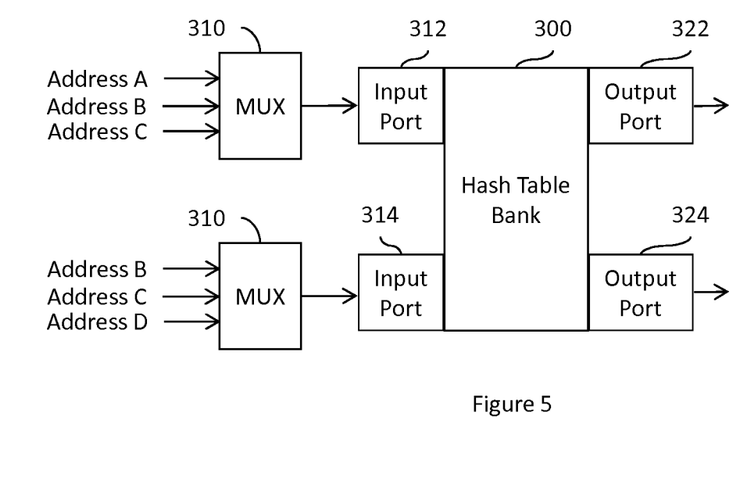
FIG. 5 is a schematic diagram of a hash table bank illustrating embodiments herein.
Figure 6:
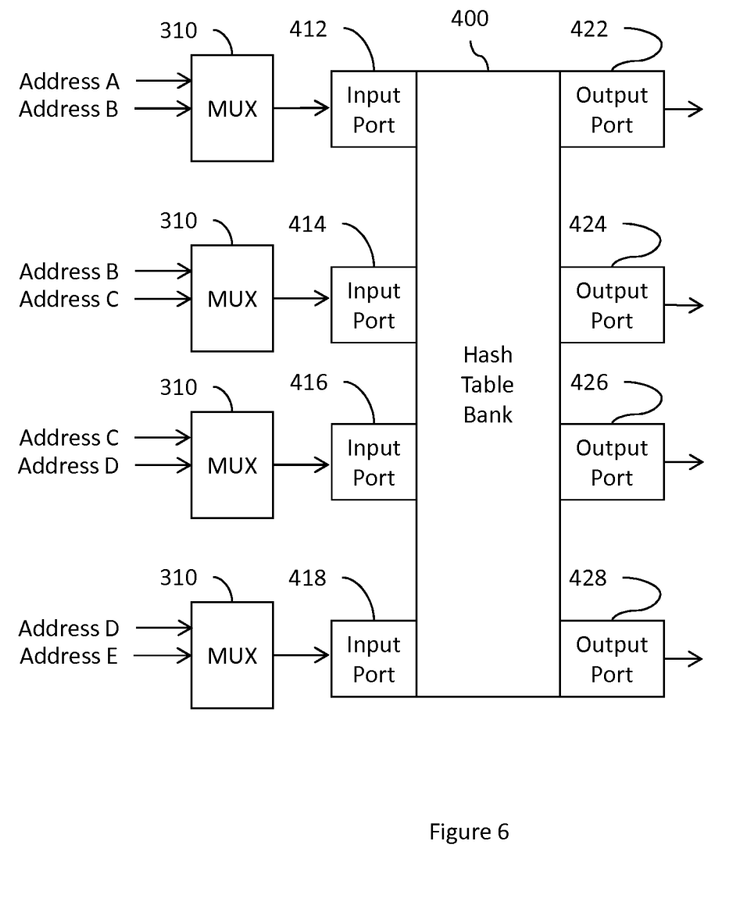
FIG. 6 is a schematic diagram of a hash table bank illustrating embodiments herein.

Details of two exemplary individual hash table banks are shown in FIGS. 5 and 6, discussed below. While two examples are shown in FIGS. 5 and 6, those ordinarily skilled in the art would understand that other forms of hash table banks could be utilized with embodiments herein. More specifically, FIG. 5 illustrates a two input/output hash table bank example; however, each hash table bank could include more ports, such as 3, 4, 5, 6, etc., and a four input/output hash table bank example with support for 5 simultaneous accesses is shown in FIG. 6.

Figure 4:
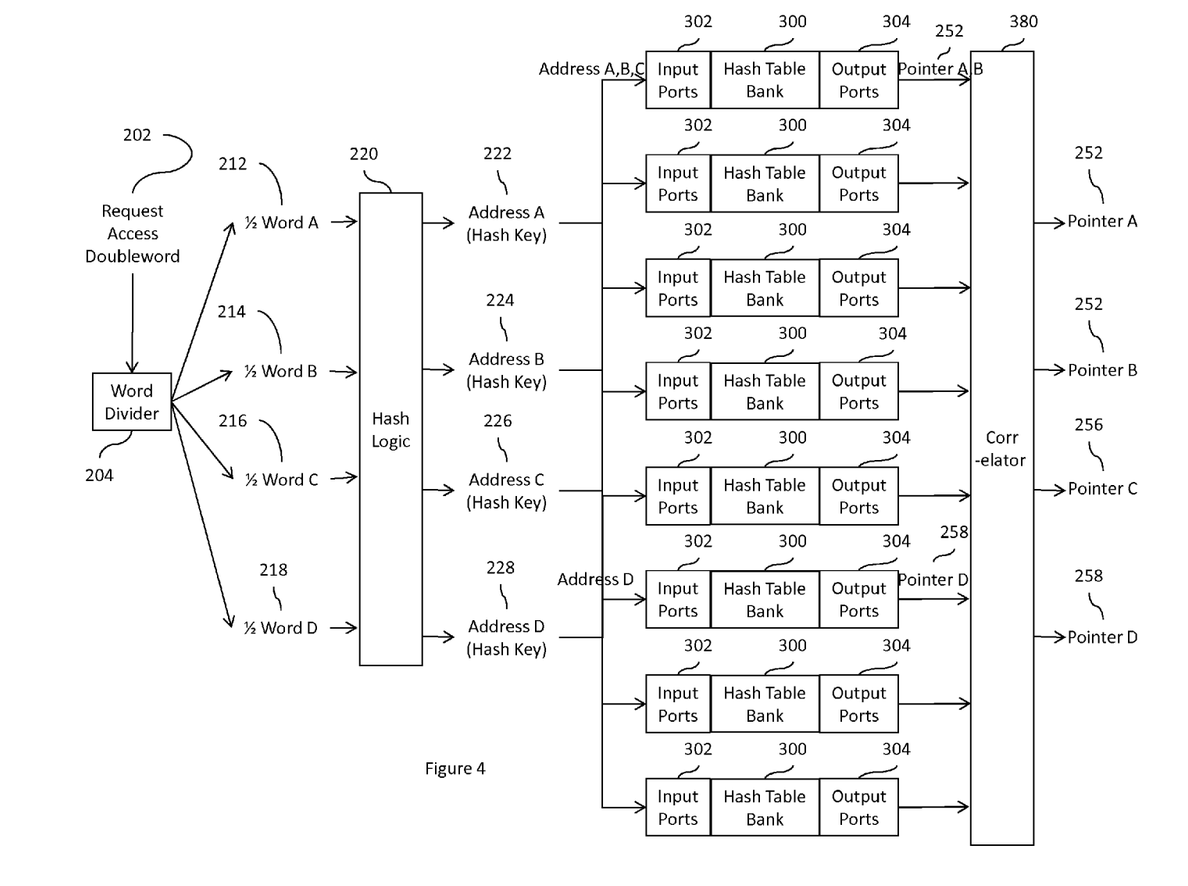
FIG. 4 is a schematic diagram of a hash table system illustrating embodiments herein.

As shown in FIGS. 5 and 6, each of the hash table banks has a plurality of physical input ports 302 (shown more specifically in FIGS. 5 and 6 as items 312, 314, 412-418) and corresponding output ports 304 (shown more specifically in FIGS. 4 and 5 as items 322, 324, 422-428). However, irrespective of the actual number of input/output ports, each of the hash table banks can have less physical input/output ports than the previously defined "first" number of addresses for each access request that will be simultaneously output from the word divider 204.

Further, these systems include a plurality of physical multiplexors 310, as shown in FIGS. 5 and 6. A physical multiplexor 310 is connected between each of the physical input ports 302 and the hash logic 220. The physical multiplexors 310 select an address (from addresses A-E) to supply to a corresponding physical input port 302 of the hash table banks 300.

Additionally, as shown in FIG. 3, a correlator 380 can be operatively connected to the output ports 304 of the hash table banks 300. The correlator 380 receives pointers from the hash table banks 300, and the correlator 380 correlates the pointers to the addresses for each of the access requests. More specifically, the correlator 380 reorganizes the pointers received from the hash table banks 300 into an order corresponding to an order of the addresses supplied to the hash table banks. Thus, in the example shown in FIG. 3, the addresses 222-228 are supplied in the order A, B, C, D. However, because there are only four pointers to be simultaneously produced (which is less than the number of hash table banks, eight in this example) a pointer will not be found in every bank. Further, as shown in FIG. 3, the pointers will not necessarily be produced in the address order (in FIG. 3, the pointers are output in the order C, B, D, A). Therefore, the correlator 380 reorganizes the pointers received from the hash table banks 300 into an order corresponding to the A, B, C, D order of the addresses supplied to the hash table banks.

In FIG. 3 each of the four addresses 222-228 accesses a different hash table bank; however in FIG. 4, three addresses A, B, and C all access a single hash table bank. In this example, each hash table bank can only simultaneously process two requests, therefore the hash bank table only outputs two pointers (A and B). However, the correlator 380 recognizes this situation and outputs an arbitrary address as pointer C. Thus, the correlator 380 also handles the case when an address is "lost", as shown with Address C in FIG. 4. The correlator 380 can pick any address within the address range to return for pointer C since downstream it will be checked. In this way, the methods and systems herein further reduce the issues associated with collisions.

Note that the word divider 204, the hash logic 220, the multiplexors 310, the correlator 380 can sometimes be referred to as a "processor" because the dividing, the hashing, the choosing, and the correlating operations can be performed by a single device and a processor could be substituted for the separate devices.

Figure 7:
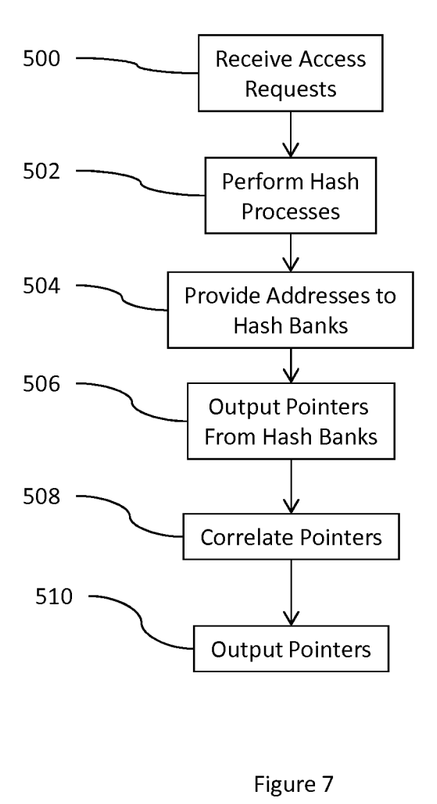
FIG. 7 is a flow diagram illustrating embodiments herein.

FIG. 7 is a flow diagram illustrating an exemplary method of accessing a hash table structure, according to embodiments herein. Beginning in item 500, this method receives a plurality of access requests for access to a physical storage device. The method performs a plurality of hash processes on the access requests in item 502, using a processor for example, to generate a first number of addresses for each access request. The addresses are within the previously defined full address range.

In item 504, this method provides the addresses to the plurality of hash table banks. As shown above, the physically separate hash table banks form the physical storage device, each of the hash table banks has a plurality of physical input ports, each of the hash table banks has less physical input ports than the first number of addresses for each access request, each of the hash table banks stores pointers corresponding to a different limited range of addresses within the full address range, and each of the different limited range of addresses is less than the full address range.

More specifically, in item 504, this exemplary method selects an address to supply to a corresponding physical input port of a corresponding hash table banks using, for example, the physical multiplexors discussed above. Next, in item 506, the method receives pointers output from the hash table banks into, for example, a correlator (discussed above). In item 508, this method correlates the pointers to the addresses for each of the access requests using the correlator. In item 510, the method outputs different ones of the pointers from the correlator in response to each of the access requests.

As will be appreciated by one skilled in the art, aspects of the systems and methods herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD- ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
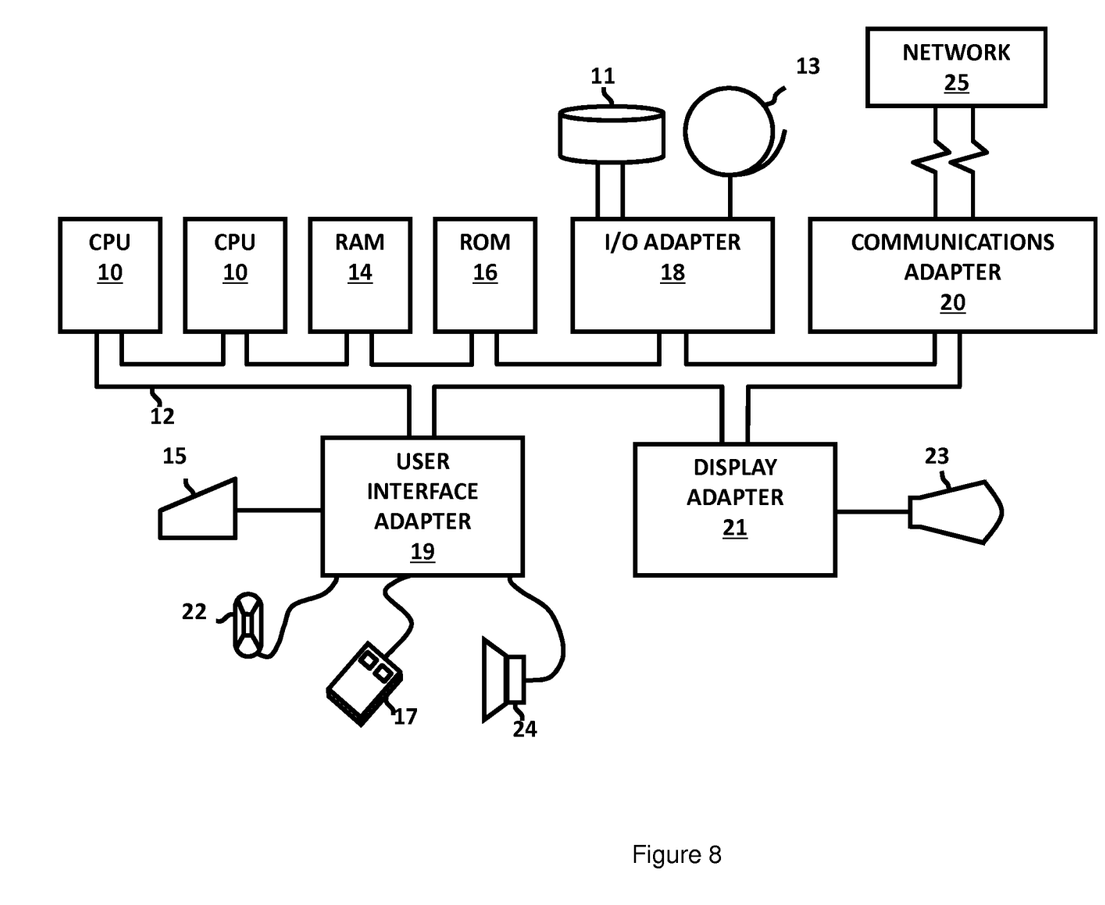
FIG. 8 is a schematic diagram of a hardware system according to embodiments herein

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A hash table structure comprising:
    a processor receiving a plurality of access requests for access to a storage device, said processor performing a plurality of hash processes on said access requests to generate a first number of addresses for each access request, and said addresses being within a full address range;
    a plurality of hash table banks operatively connected to said processor, said hash table banks forming said storage device, each of said hash table banks having a plurality of input ports, each of said hash table banks having less input ports than said first number, said processor providing said addresses to said hash table banks, each of said hash table banks storing pointers, each of said pointers corresponding to a different one of limited ranges of addresses within said full address range, and each said different one of said limited ranges of addresses being less than said full address range; and
    a correlator operatively connected to said hash table banks, said correlator receiving said pointers from said hash table banks,
    said correlator correlating ones of said pointers to corresponding ones of said addresses based on said addresses being in ones of said limited ranges of addresses of said pointers, and
    said correlator outputting different ones of said pointers corresponding to said addresses in response to each of said access requests.

2. The hash table structure according to claim 1, said access requests each comprising a double-word, and said processor dividing each double-word into half-word addresses.

3. The hash table structure according to claim 1, said correlator reorganizing said pointers received from said hash table banks into an order corresponding to an order of said addresses supplied to said hash table banks.

4. The hash table structure according to claim 1, said processor generating four addresses for each access request and each of said hash table banks having only two input ports.

5. The hash table structure according to claim 1, said pointers being stored in said hash table banks in a first in first out (FIFO) order.

6. The hash table structure according to claim 1, said hash processes comprising exclusive-OR (XOR) operations performed on a portion of said access requests.

7. A hash table structure comprising:
    a processor receiving a plurality of access requests for access to a physical storage device, said processor performing a plurality of hash processes on said access requests to generate a first number of addresses for each access request, and said addresses being within a full address range;
    a plurality of hash table banks operatively connected to said processor, said hash table banks forming said physical storage device, each of said hash table banks having a plurality of physical input ports, each of said hash table banks having less physical input ports than said first number, said processor providing said addresses to said hash table banks, each of said hash table banks storing pointers, each of said pointers corresponding to a different one of limited ranges of addresses within said full address range, and each said different one of said limited ranges of addresses being less than said full address range;
    a plurality of physical multiplexors, one of said physical multiplexors being connected between each of said physical input ports and said processor, said physical multiplexors selecting an address to supply to a corresponding physical input port of said hash table banks; and
    a correlator operatively connected to said hash table banks, said correlator receiving said pointers from said hash table banks,
    said correlator correlating ones of said pointers to corresponding ones of said addresses based on said addresses being in ones of said limited ranges of addresses of said pointers, and
    said correlator outputting different ones of said pointers corresponding to said addresses in response to each of said access requests.

8. The hash table structure according to claim 7, said access requests each comprising a double-word, and said processor dividing each double-word into half-word addresses.

9. The hash table structure according to claim 7, said correlator reorganizing said pointers received from said hash table banks into an order corresponding to an order of said addresses supplied to said hash table banks.

10. The hash table structure according to claim 7, said processor generating four addresses for each access request and each of said hash table banks having only two physical input ports.

11. The hash table structure according to claim 7, said pointers being stored in said hash table banks in a first in first out (FIFO) order.

12. The hash table structure according to claim 7, said hash processes comprising exclusive-OR (XOR) operations performed on a portion of said access requests.

13. A method of accessing a hash table structure comprising:
    receiving, by a processor, a plurality of access requests for access to a physical storage device;
    performing a plurality of hash processes on said access requests, using said processor, to generate a first number of addresses for each access request, said addresses being within a full address range;
    providing said addresses to a plurality of hash table banks operatively connected to said processor, said hash table banks forming said physical storage device, each of said hash table banks having a plurality of physical input ports, each of said hash table banks having less physical input ports than said first number, each of said hash table banks storing pointers, each of said pointers corresponding to a different one of limited ranges of addresses within said full address range, and each said different one of said limited ranges of addresses being less than said full address range;
    selecting an address to supply to a corresponding physical input port of said hash table banks using a plurality of physical multiplexors, one of said physical multiplexors being connected between each of said physical input ports and said processor; and
    receiving said pointers from said hash table banks into a correlator operatively connected to said hash table banks;
    correlating ones of said pointers to corresponding ones of said addresses for each of said access requests using said correlator based on said addresses being in ones of said limited ranges of addresses of said pointers; and
    outputting different ones of said pointers corresponding to said addresses in each of said access requests from said correlator in response to each of said access requests.

14. The method of accessing a hash table structure according to claim 13, said access requests each comprising a double-word, and said method further comprising dividing each double-word into half-word addresses using said processor.

15. The method of accessing a hash table structure according to claim 13, said correlating further comprising reorganizing said pointers received from said hash table banks into an order corresponding to an order of said addresses supplied to said hash table banks using said correlator.

16. The method of accessing a hash table structure according to claim 13, said performing of said hash processes further comprising generating four addresses for each access request using said processor, each of said hash table banks having only two physical input ports.

17. The method of accessing a hash table structure according to claim 13, said pointers being stored in said hash table banks in a first in first out (FIFO) order.

18. The method of accessing a hash table structure according to claim 13, said performing of said hash processes further comprising performing exclusive-OR (XOR) operations on a portion of said access requests, using said processor.

19. A non-transitory machine-readable storage medium readable by computerized device, said non-transitory machine-readable storage medium storing instructions, said instructions being executable by said computerized device to perform a method of accessing a hash table structure, said method comprising:
 receiving a plurality of access requests for access to a physical storage device;
 performing a plurality of hash processes on said access requests to generate a first number of addresses for each access request, said addresses being within a full address range;
 providing said addresses to a plurality of hash table banks, said hash table banks forming said physical storage device, each of said hash table banks having a plurality of physical input ports, each of said hash table banks having less physical input ports than said first number, each of said hash table banks storing pointers, each of said pointers corresponding to a different one of limited ranges of addresses within said full address range, and each said different one of said limited ranges of addresses being less than said full address range;
 selecting an address to supply to a corresponding physical input port of said hash table banks; and
 correlating ones of said pointers to corresponding ones of said addresses for each of said access requests based on said addresses being in ones of said limited ranges of addresses of said pointers; and
 outputting different ones of said pointers corresponding to said addresses in each said access requests in response to each of said access requests.

20. The non-transitory machine-readable storage medium according to claim 19, said access requests each comprising a double-word, and said method further comprising dividing each double-word into half-word addresses.

21. The non-transitory machine-readable storage medium according to claim 19, said correlating further comprising reorganizing said pointers received from said hash table banks into an order corresponding to an order of said addresses supplied to said hash table banks.

22. The non-transitory machine-readable storage medium according to claim 19, said performing of said hash processes further comprising generating four addresses for each access request, each of said hash table banks having only two physical input ports.

23. The non-transitory machine-readable storage medium according to claim 19, said pointers being stored in said hash table banks in a first in first out (FIFO) order.

24. The non-transitory machine-readable storage medium according to claim 19, said performing of said hash processes further comprising performing exclusive-OR (XOR) operations on a portion of said access requests.

* * * * *